(12) United States Patent
Lei et al.

(10) Patent No.: US 11,479,696 B2
(45) Date of Patent: Oct. 25, 2022

(54) ADHESIVE SHEET

(71) Applicant: TERAOKA SEISAKUSHO CO., LTD., Tokyo (JP)

(72) Inventors: Ming Lei, Tokyo (JP); Katsunori Todaka, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 16 days.

(21) Appl. No.: 15/564,410

(22) PCT Filed: Apr. 8, 2016

(86) PCT No.: PCT/JP2016/061536
§ 371 (c)(1),
(2) Date: Oct. 4, 2017

(87) PCT Pub. No.: WO2016/163514
PCT Pub. Date: Oct. 13, 2016

(65) Prior Publication Data
US 2018/0134926 A1    May 17, 2018

(30) Foreign Application Priority Data

Apr. 10, 2015 (JP) .............................. JP2015-080574

(51) Int. Cl.
*C09J 11/06* (2006.01)
*B32B 27/38* (2006.01)
(Continued)

(52) U.S. Cl.
CPC .................. *C09J 11/06* (2013.01); *B32B 1/06* (2013.01); *B32B 3/06* (2013.01); *B32B 5/022* (2013.01);
(Continued)

(58) Field of Classification Search
CPC .................. C09J 11/06; C09J 7/29; C09J 7/35
See application file for complete search history.

(56) References Cited

U.S. PATENT DOCUMENTS

| | | | |
|---|---|---|---|
| 6,565,969 B1* | 5/2003 | Lamon | C09J 7/10 |
| | | | 428/349 |
| 2003/0018095 A1* | 1/2003 | Agarwal | C08G 18/581 |
| | | | 521/59 |

(Continued)

FOREIGN PATENT DOCUMENTS

| | | |
|---|---|---|
| JP | 2010261030 A | 11/2010 |
| JP | 2011244596 A | 12/2011 |

(Continued)

OTHER PUBLICATIONS

International Search Report (ISR) dated Jul. 12, 2016, issued for International application No. PCT/JP2016/061536.

*Primary Examiner* — Chinessa T. Golden
(74) *Attorney, Agent, or Firm* — Law Office of Katsuhiro Arai (57) ABSTRACT

In an embodiment, an adhesive sheet has an expandable adhesive layer 2 on one side or both sides of a base 1, wherein the expandable adhesive layer 2 contains an epoxy resin including a polyfunctional epoxy resin, a phenol resin as a curing agent, an imidazole-based compound as a curing catalyst, and a temperature-sensitive foaming agent. The adhesive sheet has properties in good balance, such as fast curability, heat resistance, and adhesiveness, and also excellent properties such as thermal conductivity attributed to a good filling property.

31 Claims, 4 Drawing Sheets

(51) Int. Cl.

| | |
|---|---|
| *C09J 163/00* | (2006.01) |
| *C09J 175/04* | (2006.01) |
| *H02K 3/30* | (2006.01) |
| *B32B 27/00* | (2006.01) |
| *B32B 27/18* | (2006.01) |
| *H02K 3/34* | (2006.01) |
| *B32B 37/12* | (2006.01) |
| *B32B 27/16* | (2006.01) |
| *B32B 7/06* | (2019.01) |
| *B32B 1/06* | (2006.01) |
| *B32B 5/24* | (2006.01) |
| *B32B 27/10* | (2006.01) |
| *B32B 27/20* | (2006.01) |
| *B32B 5/20* | (2006.01) |
| *B32B 27/12* | (2006.01) |
| *B32B 3/06* | (2006.01) |
| *B32B 5/22* | (2006.01) |
| *C08J 9/32* | (2006.01) |
| *C08J 9/00* | (2006.01) |
| *B32B 5/02* | (2006.01) |
| *B32B 7/12* | (2006.01) |
| *B32B 5/18* | (2006.01) |
| *C09J 7/10* | (2018.01) |
| *C09J 7/35* | (2018.01) |
| *C09J 7/29* | (2018.01) |
| *C09J 5/06* | (2006.01) |
| *C09J 5/08* | (2006.01) |
| *C09J 11/04* | (2006.01) |
| *C09J 7/21* | (2018.01) |
| *B32B 27/26* | (2006.01) |
| *C08K 9/10* | (2006.01) |
| *C08K 5/3445* | (2006.01) |

(52) U.S. Cl.
CPC ............ *B32B 5/18* (2013.01); *B32B 5/20* (2013.01); *B32B 5/22* (2013.01); *B32B 5/24* (2013.01); *B32B 5/245* (2013.01); *B32B 7/06* (2013.01); *B32B 7/12* (2013.01); *B32B 27/00* (2013.01); *B32B 27/10* (2013.01); *B32B 27/12* (2013.01); *B32B 27/16* (2013.01); *B32B 27/18* (2013.01); *B32B 27/20* (2013.01); *B32B 27/26* (2013.01); *B32B 27/38* (2013.01); *B32B 37/1207* (2013.01); *C08J 9/0028* (2013.01); *C08J 9/0061* (2013.01); *C08J 9/0085* (2013.01); *C08J 9/0095* (2013.01); *C08J 9/32* (2013.01); *C09J 5/06* (2013.01); *C09J 5/08* (2013.01); *C09J 7/10* (2018.01); *C09J 7/21* (2018.01); *C09J 7/29* (2018.01); *C09J 7/35* (2018.01); *C09J 11/04* (2013.01); *C09J 163/00* (2013.01); *C09J 175/04* (2013.01); *H02K 3/30* (2013.01); *H02K 3/34* (2013.01); *B32B 2037/1253* (2013.01); *B32B 2250/02* (2013.01); *B32B 2250/03* (2013.01); *B32B 2250/04* (2013.01); *B32B 2250/05* (2013.01); *B32B 2250/40* (2013.01); *B32B 2250/42* (2013.01); *B32B 2255/02* (2013.01); *B32B 2255/12* (2013.01); *B32B 2255/26* (2013.01); *B32B 2262/101* (2013.01); *B32B 2266/0271* (2013.01); *B32B 2307/206* (2013.01); *B32B 2307/302* (2013.01); *B32B 2307/306* (2013.01); *B32B 2307/308* (2013.01); *B32B 2307/542* (2013.01); *B32B 2307/544* (2013.01); *B32B 2307/546* (2013.01); *B32B 2307/732* (2013.01); *B32B 2307/748* (2013.01); *B32B 2457/04* (2013.01); *C08J 9/0066* (2013.01); *C08J 2207/02* (2013.01); *C08J 2363/04* (2013.01); *C08J 2461/04* (2013.01); *C08J 2463/02* (2013.01); *C08J 2475/04* (2013.01); *C08K 5/3445* (2013.01); *C08K 9/10* (2013.01); *C09J 2301/408* (2020.08); *C09J 2301/412* (2020.08); *C09J 2400/263* (2013.01); *C09J 2461/00* (2013.01); *C09J 2463/00* (2013.01); *Y02T 10/64* (2013.01)

(56) References Cited

U.S. PATENT DOCUMENTS

| | | | |
|---|---|---|---|
| 2003/0203192 A1* | 10/2003 | Kiuchi | ............ C09J 7/38 428/343 |
| 2012/0121878 A1* | 5/2012 | Bilcai | ............ C09J 163/00 428/220 |
| 2020/0181458 A1 | 6/2020 | Lei et al. | |

FOREIGN PATENT DOCUMENTS

| | | |
|---|---|---|
| JP | 2012170248 A | 9/2012 |
| JP | 2013006999 A | 1/2013 |
| JP | 2013030761 A | 2/2013 |
| JP | 2013104044 A | 5/2013 |
| JP | 2013131593 A | 7/2013 |
| JP | 2015054935 A | 3/2015 |

\* cited by examiner

ADHESIVE SHEET

This application is the U.S. National Phase under 35 U.S.C. § 371 of International Application PCT/JP2016/061536, filed Apr. 8, 2016, which claims priority to Japanese Patent Application No. 2015-080574, filed Apr. 10, 2015. The International Application was published under PCT Article 21(2) in a language other than English.

TECHNICAL FIELD

The present invention relates to an adhesive sheet having an expandable adhesive layer containing an epoxy resin and a temperature-sensitive foaming agent. The adhesive sheet of the present invention is useful, for example, for an application in which the sheet is used between two members such as a stator and a coil in a motor generator, expanded, foamed and cured by heating, and filled in its interspace, thereby mutually adhering the members.

BACKGROUND ART

An epoxy resin adhesive is widely used for adhesion of members and structural bonding because of excellent heat resistance and strong adhesiveness.

For example, in motors of electric vehicles and hybrid automobiles having rapidly spread recently, a coil composed of wound and bundled enamel wire is fixed to a stator core with an epoxy resin. In conventional methods, an insulating paper is inserted between a conductor coil and a stator core, a liquid epoxy resin adhesive is injected into an interspace (clearance) between a conductor coil and a stator core, and the adhesive is cured by heating, thereby fixing the conductive coil to the stator core. However, since the clearance between a conductor coil and a stator core is very narrow and an adhesive is hard to enter the clearance, a void space is formed. When the clearance is enlarged to avoid this, heat dissipation of a motor decreases, leading to a lowering in the performance, because of low heat dissipation of the adhesive, and for complete filling, a large amount of an adhesive is required. In addition, a work of removing an excessive adhesive from a stator core is necessary. Further, correct control of the coating amount and the coating position of a liquid adhesive is generally difficult. Furthermore, a heat-curable adhesive such as an epoxy resin shows a lowering in viscosity and drips readily when heated, possibly polluting an adherend and the working periphery, thus, it is required to prevent liquid-drip to parts other than the adhesion part by using fixtures such as a fence and a wall. As described above, a liquid epoxy resin adhesive has a lot of problems of workability in use.

Then, there are suggestions on use of an adhesive sheet having a foamable epoxy resin adhesive layer instead of the liquid epoxy resin adhesive (Patent documents 1 to 4). However, properties required for an adhesive sheet used in production of an automobile motor are wide-ranging in addition to workability. In a foaming and curing step of an adhesive layer, for example, it is preferable that the adhesive layer is foamed and cured uniformly in a short period of time while keeping appropriate viscosity of the adhesive. Specifically, it is required that the adhesive layer is foamed and cured in about 30 minutes, preferably about 10 minutes at 180° C. Further, it is necessary that the foamed and cured adhesive sheet has flexibility and close adhesion to a base so that the adhesive layer is not detached. Further, heat resistance by which adhesion strength does not decrease even if heated under an atmosphere not only of room temperature, but also of high temperatures, specifically at 150° C., preferably at 200° C. for 500 hours or more, and oil resistance by which adhesion strength does not decrease even if immersed in a lubricant oil, are required. Further, irregularity of an adherend such as a coil composed of bundled conductive wire should be filled. For suppressing a lowering in the performance of a motor due to temperature elevation, it is also necessary to be excellent in heat dissipation and thermal conductivity. Further, shape retention capacity and firmness of a base are necessary so that an adhesive sheet can be inserted at high speed into a narrow clearance between a conductor coil and a stator, and an insulation property for securing insulation reliability of a stator and coated conductive wire is necessary. No use of a release paper is also required in some cases, with consideration for environmental problems such as waste generation.

Patent document 1 has an object of fixing a coil of a stator to a stator core infallibly with an adhesive sheet, and does not consider fast curability and heat resistance (for example, suppression of a lowering in adhesion strength under high temperatures). Patent documents 2 and 3 describe an adhesive sheet inferior in a filling property onto an irregular adherend and thermal conductivity since an intermediate layer of the adhesive sheet is a foaming layer and an adhesive layer not foaming is disposed on the outside thereof, and do not consider fast curability and heat resistance (for example, suppression of a lowering in adhesion strength under high temperatures). Patent document 4 has a main object of improving adhesiveness and workability, and does not consider fast curability and heat resistance (suppression of a lowering in adhesion strength under high temperatures).

RELATED ART DOCUMENTS

Patent Documents

[Patent document 1] JP-A No. 2011-244596
[Patent document 2] JP-A No. 2010-261030
[Patent document 3] JP-A No. 2012-170248
[Patent document 4] JP-A No. 2013-104044

SUMMARY OF INVENTION

Technical Problem

The object of the present invention is to provide an adhesive sheet especially having properties such as fast curability, heat resistance and adhesiveness in good balance and also having various excellent properties such as thermal conductivity caused by a good filling property.

Solution to Problem

The present invention is an adhesive sheet having an expandable adhesive layer containing an epoxy resin comprising a polyfunctional epoxy resin, a phenol resin as a curing agent, an imidazole-based compound as a curing catalyst and a temperature-sensitive foaming agent.

Advantageous Effects of Invention

The adhesive sheet of the present invention has high flexibility irrespective of foaming and curing in a short period of time of the expandable adhesive layer, and is also excellent in various properties required for an adhesive sheet used in production of a motor of an automobile, for example.

That is, according to the present invention, an adhesive sheet especially having properties such as fast curability, heat resistance and adhesiveness in good balance and also having various excellent properties such as thermal conductivity caused by a good filling property is provided.

MODES FOR CARRYING OUT THE INVENTION

FIGS. 1 to 7 are schematic cross-sectional views each showing one embodiment of the adhesive sheet of the present invention. In the embodiment shown in FIG. 1, an expandable adhesive layer 2 is provided on both sides of a single-layered base 1, and the expandable adhesive layer 2 contains an appropriate amount of a heat resistant filler. If required, a releasing agent layer 3 is provided on the surface of one expandable adhesive layer 2 in some cases.

Figure 2:
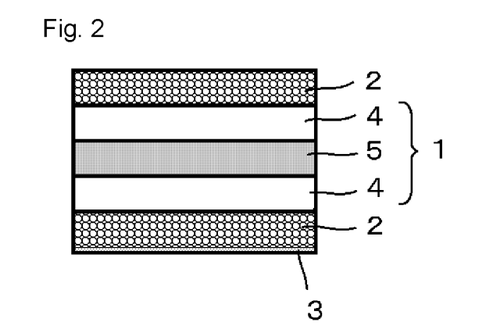
FIG. 2 is a schematic cross-sectional view showing one embodiment of the adhesive sheet of the present invention.

In the embodiment shown in FIG. 2, a base 1 is composed of a laminate having a structure in which two resin films 4 are laminated via an adhesive layer for lamination 5. The adhesive layer for lamination 5 contains an appropriate amount of a heat resistant filler. An expandable adhesive layer 2 is provided on both sides of the base 1, and the expandable adhesive layer 2 contains an appropriate amount of a heat resistant filler. If necessary, a releasing agent layer 3 is provided on the surface of the expandable adhesive layer 2 in some cases.

Figure 3:
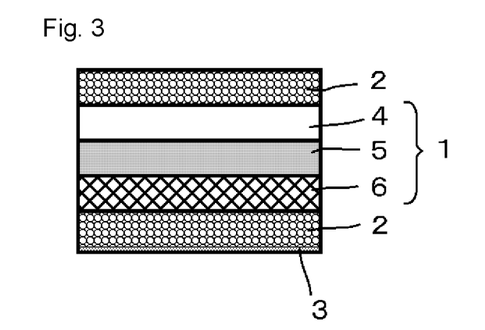
FIG. 3 is a schematic cross-sectional view showing one embodiment of the adhesive sheet of the present invention.

In the embodiment shown in FIG. 3, a base 1 is composed of a laminate having a structure in which a resin film 4 and a non-woven fabric 6 are laminated via an adhesive layer for lamination 5. The non-woven fabric 6 is impregnated with a resin composition containing an appropriate of a heat resistant filler. The other constitution is the same as in FIG. 2.

Figure 4:
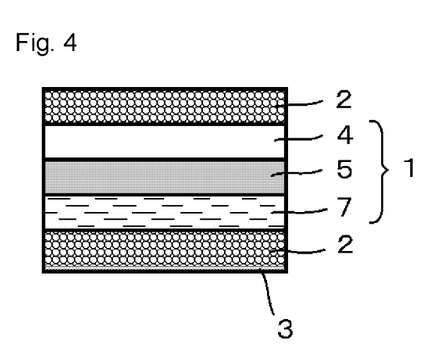
FIG. 4 is a schematic cross-sectional view showing one embodiment of the adhesive sheet of the present invention.

In the embodiment shown in FIG. 4, a base 1 is composed of a laminate having a structure in which a resin film 4 and a paper 6 are laminated via an adhesive layer for lamination 5. The other constitution is the same as in FIG. 2.

Figure 5:
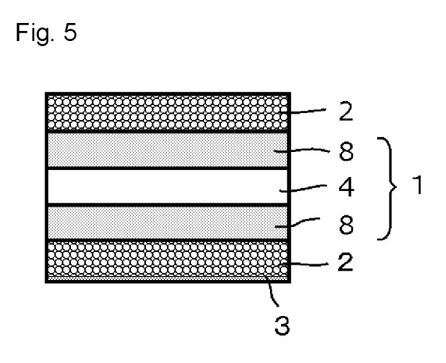
FIG. 5 is a schematic cross-sectional view showing one embodiment of the adhesive sheet of the present invention.

In the embodiment shown in FIG. 5, a base 1 is composed of a laminate in which a functional adhesive layer 8 is disposed on both sides of a resin film 4. The functional adhesive layer 8 contains an appropriate amount of a heat resistant filler and an appropriate amount of a fibrous filler. The other constitution is the same as in FIG. 2.

Figure 6:
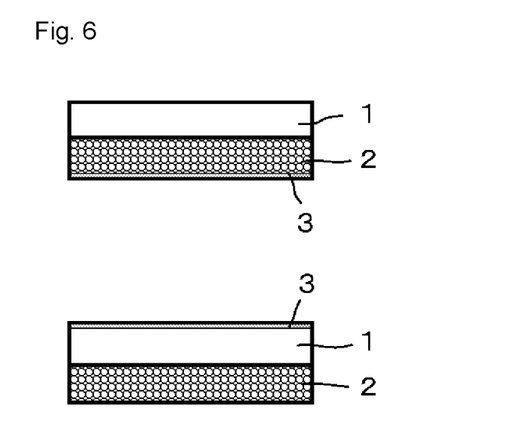
FIG. 6 is a schematic cross-sectional view showing one embodiment of the adhesive sheet of the present invention.

In the embodiment shown in FIG. 6, an expandable adhesive layer 2 is provided on one side of a single-layered base 1, and the expandable adhesive layer 2 contains an appropriate amount of a heat resistant filler. Further, a releasing agent layer 3 is provided on surface of the expandable adhesive layer 2 or the base 1.

Figure 7:
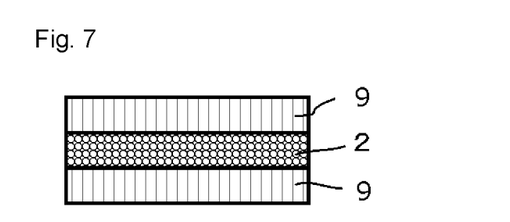
FIG. 7 is a schematic cross-sectional view showing one embodiment of the adhesive sheet of the present invention.

In the embodiment shown in FIG. 7, a base 1 is not present, and a release film 9 is provided on both sides of an expandable adhesive layer 2. The expandable adhesive layer 2 contains an appropriate amount of a heat resistant filler. Such a base-less type adhesive sheet is used after peeling the release film 9.

The constitutions of the adhesive sheet of the present invention will be illustrated below.

[Base 1]

The base 1 in the present invention is a member for supporting an expandable adhesive layer 2 as shown in FIGS. 1 to 6. A base-less type adhesive sheet having no base 1 as shown in FIG. 7 may also be permissible.

It is preferable that the base 1 has heat resistance. The level of heat resistance varies depending on use, and for example, the melt temperature of the base 1 is preferably 200° C. or more, more preferably 250° C. or more. Further, for example, the continuous use temperature of the base 1 measured according to UL-746B is preferably 100° C. or more, more preferably 150° C. or more. When the base 1 contains a resin, the glass transition temperature of the resin is preferably 80° C. or more, more preferably 140° C. or more, particularly preferably 200° C. or more.

Figure 1:
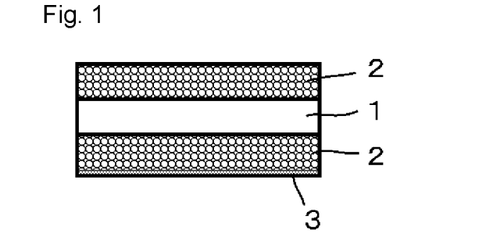
FIG. 1 is a schematic cross-sectional view showing one embodiment of the adhesive sheet of the present invention.

The base 1 may be a single-layered base composed of one member as shown in FIGS. 1 and 6, may be a base composed of a laminate having a laminated structure in which one member and the other member are laminated with an adhesive for lamination as shown in FIGS. 2 to 4, or may be a base composed of a laminate in which a functional adhesive layer is provided on one side or both sides of a member as shown in FIG. 5. The base 1 may have flexibility, or may have repulsion, and its property is selected appropriately depending on use. In use requiring the shape retention capacity and the stiffness of an adhesive sheet, the base 1 is preferably a base composed of a laminate having a laminated structure in which one member and the other member are laminated with an adhesive for lamination as shown in FIGS. 2 to 4 and a base composed of a laminate in which a functional adhesive layer is provided on one surface or both surfaces of a member as shown in FIG. 5, and it is more preferable that the member is at least one member selected from the group consisting of a resin film 4, a non-woven fabric 6 and a paper 7. Further specifically, more preferable is a base 1 composed of a laminate having a laminated structure in which a resin film 4 and a non-woven fabric 6, or a resin film 4 and a paper 7 or a resin film 4 and a resin film 4 are laminated with an adhesive for lamination as shown in FIGS. 2 to 4. These suitable embodiments are very suitable in use such as, for example, production of a slot of a motor. The reason for this is that a base having high stiffness and excellent in shape retention capacity after bending is required in such use because of necessity of stable insertion at high speed of an adhesive sheet into a narrow interspace such as a slot.

Specific examples of the resin film 4 include polyester type resins such as polyethylene terephthalate (PET), polybutylene terephthalate, polyethylene naphthalate (PEN) and aromatic polyester; polycarbonates; polyarylates; polyurethanes; polyamide type resins such as polyamide and polyether amide; polyimide type resins such as polyimide, polyether imide and polyamide imide; polysulfone type resins such as polysulfone and polyether sulfone; polyether ketone type resins such as polyether ketone and polyether ether ketone; polyphenylene sulfide (PPS); and modified polyphenylene oxide. Two or more resin films 4 may be used in combination. Among them, polyethylene naphthalate (PEN) is preferable from the standpoint of balance of heat resistance, insulation and cost.

Specific examples of the non-woven fabric 6 include non-woven fabrics containing fibers such as a cellulose fiber, a polyester fiber, a nylon fiber, an aramid fiber, a polyphenylene sulfide fiber, a liquid crystal polymer fiber, a glass fiber, a metal fiber and a carbon fiber. Two or more non-woven fabrics 6 may be used in combination. Among them, an aramid fiber non-woven fabric, a glass fiber non-woven fabric, a polyphenylene sulfide fiber nonwoven fabric, a heat resistant nylon fiber non-woven fabric and a heat resistant polyester fiber non-woven fabric are preferable. It is preferable that the non-woven fabric 6 is impregnated with a resin composition containing a heat resistant filler from the standpoint of heat resistance, thermal conductivity and prevention of penetration of the expandable adhesive layer 2. Specific examples of the resin include a polyester resin, a polyamide resin, a butyral resin, a urethane resin, an acryl resin and an epoxy resin. Among them, a urethane resin is preferable. Specific examples of the heat resistant filler are the same as specific examples of heat resistant fillers contained in adhesives described later.

As the paper 7, those having low water absorbability and high heat resistance are preferable. Particularly, a highly heat resistant paper composed of a wholly aromatic polyamide polymer is preferable. The paper 7 may also be an embodiment of a mixed paper containing two or more fibers.

Both the adhesive layer for lamination 5 and the functional adhesive layer 8 are layers formed by using an adhesive. The adhesive layer for lamination 5 is a layer provided intending lamination of members constituting a base, and if necessary, can also be filled with suitable amounts of additives for imparting special functions such as thermal conductivity, insulation and heat resistance. The functional adhesive layer 8 is a layer provided intending imparting some functions (heat resistance, thermal conductivity and stiffness) to an adhesive, by inclusion of components (filler) other than the adhesive. The functional adhesive layer 8 is provided, for example, on one side or both sides of a member selected from the group consisting of a resin film 4, a non-woven fabric 6 and a paper 7.

The adhesive constituting the adhesive layer for lamination 5 and the functional adhesive layer 8 is not particularly restricted. The same adhesive as the adhesive constituting the expandable adhesive layer 2 described later can also be suitably used. Particularly, it is preferable that a component of low softening point and a liquid component are contained from the standpoint of wettability and uniformity of adhesion to the film 4. Further, an epoxy resin of small cure shrinkage rate is preferable from the standpoint of smoothness of a laminated base. The adhesive constituting the adhesive layer for lamination 5 and the functional adhesive layer 8 may contain a temperature-sensitive foaming agent, however, in some cases, it is preferable that the temperature-sensitive foaming agent is not contained and foaming is not carried out.

The adhesive constituting the adhesive layer for lamination 5 and the functional adhesive layer 8 preferably contains a heat resistant filler from the standpoint of heat resistance and thermal conductivity. The kind of the heat resistant filler is not particularly restricted, and the filler includes, for example, inorganic fillers such as aluminum oxide, magnesium oxide, calcium oxide, aluminum hydroxide, magnesium hydroxide, boron nitride, silicon nitride, silicon oxide and talc (magnesium silicate). Two or more heat resistant fillers may be used in combination. The content of the heat resistant filler is preferably 10 to 300 parts by mass, more preferably 50 to 150 parts by mass with respect to 100 parts by mass of resin components in the adhesive.

The adhesive constituting the adhesive layer for lamination 5 and the functional adhesive layer 8 may contain a fibrous filler as the heat resistant filler. Particularly, the adhesive constituting the functional adhesive layer 8 preferably contains a fibrous filler. The fibrous filler is useful from the standpoint of improvement of stiffness of the adhesive sheet. Specific examples of the fibrous filler include a polyester fiber, a polyamide fiber and a glass fiber. Two or more fibrous fillers may be used in combination. Among them, a glass fiber is preferable. The average fiber diameter of a fibrous filler is preferably 1 to 20 μm, and the average fiber length thereof is preferably 10 to 150 μm.

The base 1 may be subjected to a corona treatment and a primer treatment for improving close adhesion to the expandable adhesive layer 2.

The thickness of the base 1 may be appropriately selected depending on use, and in general, it is 2 to 200 μm. Particularly, when used for adhesion insulation between a stator and a coil of a motor, it is preferably 9 to 100 μm, more preferably 12 to 50 μm.

[Expandable Adhesive Layer 2]

The expandable adhesive layer 2 in the present invention contains an epoxy resin comprising a polyfunctional epoxy resin, a phenol resin as a curing agent, an imidazole-based compound as a curing catalyst and a temperature-sensitive foaming agent.

The expandable adhesive layer 2 preferably contains an epoxy resin as the main component. The kind of the polyfunctional epoxy resin is not particularly restricted, and preferable are novolac type epoxy resins such as a phenol novolac type and a cresol novolac type, and mixtures thereof. When the novolac type epoxy resin is used, the glass transition temperature of the cured product increases, thus, adhesive force tends to be stable even under high temperatures.

As the epoxy resin, epoxy resins other than the polyfunctional epoxy resin may be used in combination. By use of the polyfunctional epoxy resin and other epoxy resins in admixture, the physical properties such as softening temperature, melt viscosity, glass transition temperature and storage elastic modulus of the epoxy resin can be controlled easily and in detail. In general, when an epoxy resin of low softening temperature or in liquid state is mixed, flowability in heating and flexibility before and after curing, of the adhesive layer, can be enhanced. In contrast, when an epoxy resin of high softening temperature or in semi-solid or solid state is mixed, tackiness of the surface of the adhesive layer can be decreased. Further, the liquid epoxy resin can also be used for the purpose of pre-dispersing components such as a thermally expandable microcapsule in power or grain state contained in the temperature-sensitive foaming agent, or for the purpose of uniformly mixing components of the epoxy resin.

Specific examples of the epoxy resin which can be mixed as described above include bisphenol type epoxy resins such as a bisphenol A type, a dimer acid-modified bisphenol A type and a bisphenol F type; epoxy resins having an aliphatic skeleton such as hexane diol diglycidyl ether; phenoxy resins (polyhydroxy polyether synthesized from bisphenols and epichlorohydrin); and crystalline epoxy resins. The crystalline epoxy resin is non-tacky solid at normal temperature, while acts as a reactive diluent at melting temperature or more since melt viscosity lowers significantly at melting temperature or more. For this reason, when the crystalline epoxy resin is contained in the adhesive layer, flowability in heating of the adhesive layer can be more enhanced, acting advantageously on thermal expansion of the adhesive layer. Since it is non-tacky solid at room temperature, it is useful for reducing stickiness of the surface of the adhesive layer, or for rendering the surface of the adhesive layer non-sticky. When the adhesive layer is formed by a melt coating method, the melt viscosity of the epoxy resin can be lowered to enhance the speed of melt coating, by heating at temperatures not lower than the melting temperature of the crystalline epoxy resin.

The number-average molecular weight of the epoxy resin is generally 100 to 60000 in terms of standard polystyrene by GPC. The epoxy equivalent of the epoxy resin is generally 50 to 30000 g/eq.

As the curing agent for an epoxy resin used in the expandable adhesive layer 2, a phenol resin is used. In the present invention, to use a phenol resin as a curing agent, in combination with an imidazole-based compound as a curing catalyst described later, is important for shortening the curing time and improving heat resistance. By using a phenol resin as a curing agent, it becomes easy to design heat resistance and electric properties. The addition amount of a phenol resin is determined so that, theoretically, the hydroxyl group equivalent number of a phenol resin with respect to the epoxy equivalent number of an epoxy resin is around 1:1. The ratio of the hydroxyl group equivalent number of a phenol resin to the epoxy equivalent number of an epoxy resin is usually 0.5 to 2.0, preferably 0.8 to 1.2.

As the curing catalyst for an epoxy resin used in the expandable adhesive layer 2, an imidazole-based compound is used. In the present invention, to use an imidazole-based compound as a curing catalyst, in combination with a phenol resin as a curing agent, is important for shortening the curing time and improving heat resistance. For example, in conventional technologies, no phenol resin is used as a curing agent and an imidazole-based compound is used in large amounts as a curing agent in a certain case, however, in this case, durability such as heat resistance for a long period of time as in the present invention is not obtained easily. In the present invention, an imidazole-based compound is used as a curing catalyst, namely, used only in amounts as a catalyst (in small amounts) and a phenol resin is used as a curing agent, namely, used in amounts as a curing agent (in large amounts), and by this, the effect of the present invention is obtained. The imidazole-based compound can be used as a single catalyst and grades of very fine particle size are present, thus, the imidazole-based compound has a merit of easy use, as compared with other curing catalysts.

Specific examples of the imidazole-based compound include imidazole derivatives such as 2-phenyl-4,5-dihydroxymethylimidazole, 2-phenyl-4-methylimidazole, 2-ethyl-4-methylimidazole, 2,4-diethylimidazole and 2-phenyl-4-methyl-5-hydroxyimidazole. Two or more imidazole-based compounds may be used in combination. Among them, 2-phenyl-4,5-dihydroxymethylimidazole is preferable. The content of the imidazole-based compound is preferably 0.1 to 1.0 parts by mass, more preferably 0.3 to 0.8 parts by mass with respect to 100 parts by mass of resin components in the expandable adhesive layer.

The temperature-sensitive foaming agent used in the expandable adhesive layer 2 includes, for example, inorganic foaming agents such as ammonium carbonate, ammonium hydrogen carbonate, ammonium nitrite, ammonium borohydride and azides; organic foaming agents such as alkane fluorides such as trichloromonofluoromethane, azo compounds such as azobisisobutyronitrile, hydrazine compounds such as p-toluene sulfonyl hydrazide, semi-carbazide compounds such as p-toluene sulfonyl semicarbazide, triazole compounds such as 5-morpholyl-1,2,3,4-thiatriazole, and N-nitroso compounds such as N,N-dinitrosoterephthalamide; thermally expandable microcapsules obtained by microcapsulating a thermal expansion agent composed of a hydrocarbon compound. Two or more temperature-sensitive foaming agents may be used in combination. Among them, thermally expandable microcapsules are preferable from the standpoint of no inhibition of curing of an epoxy resin and reduction of adverse effects exerted on physical properties of an epoxy resin.

The thermally expandable microcapsule is a microcapsule having a thermoplastic resin having a gas barrier property as a shell and enclosing a thermal expansion agent inside the shell. When the thermally expandable microcapsule is heated, the thermoplastic resin as a shell softens and the volume of the thermal expansion agent increases, thereby expanding the capsule. For example, vaporization of a hydrocarbon compound having low boiling point can be utilized for expansion of the capsule.

The expansion (foaming) temperature of the thermally expandable microcapsule is preferably not less than the softening temperature of the epoxy resin and not more than the activation temperature of the curing reaction of the epoxy resin. When this foaming temperature is not less than the softening temperature of the epoxy resin, the thermal expansion agent can be expanded sufficiently in the softened epoxy resin and the thickness of the expandable adhesive layer 2 after foaming can be made uniform. When this foaming temperature is not more than the activation temperature of the curing reaction of the epoxy resin, curing of an epoxy resin before foaming can be prevented. Further, when melt or solution coating is contained in the production process of the adhesive sheet, gelling of an epoxy resin during these coating steps and an accompanying drying step can be prevented, by adjusting the softening temperature of an epoxy resin to be not more than the activation temperature of the curing reaction.

The softening temperature of an epoxy resin can be measured using a ring and ball softening temperature test method prescribed in JIS K 2207. The foaming temperature of the thermally expandable microcapsule is a temperature at which volume variation of the thermally expandable microcapsule occurs, and it can be selected, for example, from a range of 70° C. or more and 200° C. or less, preferably 100° C. or more and 180° C. or less.

The content and the volume expansion modulus of the temperature-sensitive foaming agent can be appropriately determined according to the strength and the adhesive force required for the cured expandable adhesive layer 2 and the expansion modulus required for the adhesive sheet. The content of the temperature-sensitive foaming agent is preferably 0.5 to 20 parts by mass, more preferably 2 to 15 parts by mass with respect to 100 parts by mass of resin components in the expandable adhesive layer 2. The increase factor of the thickness of the adhesive sheet after foaming can be, for example, 1.1 times or more and 10 times or less.

It is preferable that other resins (heat resistant resin) are added to the expandable adhesive layer 2 from the standpoint of close adhesion to the base 1, flexibility when bending the adhesive sheet, a leveling property in coating an adhesive and prevention of liquid drip in conducting heating, foaming and curing. Specific examples the other resins include a polyester resin, a butyral resin, a urethane resin, a carboxyl group-terminated butadiene nitrile rubber (CTBN) and epoxy-modified butadiene. Among them, a urethane resin is most preferable from the standpoint of flexibility and adhesiveness.

The urethane resin is, in general, a resin containing a soft segment composed of a polyol monomer unit and a hard segment composed of a polyfunctional isocyanate compound or a low molecular glycol monomer unit. The polyol used in the urethane resin is a compound having two or more hydroxyl groups. The number of a hydroxyl group of the polyol is preferably 2 to 3, more preferably 2 from the standpoint of enhancing properties such as rubber elasticity elongation recovery rate. As the polyol, for example, polyester polyol, polyether polyol, polycaprolactone polyol, polycarbonate polyol and castor oil-based polyol can be used. Two or more polyols may be used in combination.

As the polyfunctional isocyanate compound used as the cross-linking agent for crosslinking a polyol, for example, polyfunctional aliphatic isocyanate compounds, polyfunctional alicyclic isocyanate compounds, and polyfunctional aromatic isocyanate compounds can be used. Further, trimethylolpropane adducts of these compounds, a biuret body reacted with water, and a trimer having an isocyanurate ring can also be used. Two or more polyfunctional isocyanate compounds may be used in combination.

Specific examples of the polyfunctional aliphatic isocyanate compound include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate and 2,4,4-trimethylhexamethylene diisocyanate.

Specific examples of the polyfunctional alicyclic isocyanate compound include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate and hydrogenated tetramethylxylylene diisocyanate.

Specific examples of the polyfunctional aromatic diisocyanate compound include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate.

The urethane resin is obtained by curing a composition containing the polyol and the polyfunctional isocyanate compound explained above. Particularly, low crystallinity linear polyester type polyurethane resins are preferable, and hexanediol copolyester type polyurethane resins and polytetramethylene glycol type polyurethane resins are more preferable, from the standpoint of properties such as rubber elastic elongation recovery rate.

The content of the urethane resin is preferably 60 parts by mass or less in 100 parts by mass of resin components in the expandable adhesive layer 2.

It is preferable that the expandable adhesive layer 2 contains a heat resistant filler from the standpoint of heat resistance and thermal conductivity. The kind of the heat resistant filler is not particularly restricted, and the heat resistant filler includes, for example, inorganic fillers such as aluminum oxide, magnesium oxide, calcium oxide, aluminum hydroxide, magnesium hydroxide, boron nitride, silicon nitride, silicon oxide and talc (magnesium silicate). Two or more heat resistant fillers may be used in combination. The content of the heat resistant filler is preferably 20 to 300 parts by mass, more preferably 50 to 100 parts by mass with respect to 100 parts by mass of resin components in the adhesive.

The expandable adhesive layer 2 may contain additives such as antioxidants such as phenol type antioxidants and sulfur-based antioxidants, silane coupling agents such as epoxy-modified alkoxysilanes, thixotropic agents such as fumed silica, and pigments and dyes for identification, if necessary.

The expandable adhesive layer 2 may be a continuous layer, or a discontinuous layer constituted of a plurality of patterns such as stripes and dots. Further, irregularities such as emboss may be formed on the surface of the expandable adhesive layer 2. By making the expandable adhesive layer 2 discontinuous or forming irregularities such as emboss on the surface of the adhesive layer, tackiness of the surface of the expandable adhesive layer 2 can be decreased, or the adhesive layer can be made substantially non-tacky, adhesive force can be controlled, and the adhesive layer can be formed only at a necessary part. Since ununiformity of the surface of the expandable adhesive layer 2 as described above is alleviated or annihilated in foaming, an adverse effect on adhesive force due to its ununiformity does not occur easily.

[Releasing Agent Layer 3]

On a general double-faced adhesive sheet, a release paper is usually provided for the purpose of preventing agglutination of an adhesive layer. Recently, however, an adhesive sheet using no release paper is required in some cases out of environmental consideration. In general, an adhesive layer is desired to have tackiness enough to be temporarily fixed to an adherend in many cases, however, in some cases, it is advantageous that an adhesive layer is non-tacky (tack free) before heating. For example, if the expandable adhesive layer 2 is non-tacky, handling and workability of an adhesive sheet improve further. Specifically, in the case of adhesion of a stator core and a coil, an adhesive sheet having a non-tacky adhesive layer can be inserted smoothly into an interspace of a stator core, and a coil can be inserted more smoothly into a more narrowed interspace after insertion of the adhesive sheet. From such a standpoint, it is preferable to coat a releasing agent on the surface of at least one expandable adhesive layer 2 in the adhesive sheet of the present invention. Further, when the base 1 has the expandable adhesive layer 2 on both sides thereof, it is preferable to coat a releasing agent on the surface of at least one expandable adhesive layer 2.

In conventional technologies, a releasing agent is usually coated on the surface of a base, not on the adhesive layer. In contrast, a releasing agent is coated directly on the surface of the expandable adhesive layer 2, according to a fresh concept, and no effect on properties such as adhesiveness can be realized, in the present invention. The releasing agent used in the present invention is required to satisfy any of the following requisites (a) and (b) to decrease adverse effects on the expandable adhesive layer 2.

(a) Components constituting the releasing agent have low molecular weight, and a releasing function is exerted at low temperatures (temperature in preservation of an adhesive sheet before use), while the components are decomposed, vaporized or sublimated to almost lose a releasing function at high temperatures (temperature in foaming and curing of an adhesive sheet in use).

(b) The coating amount of a releasing agent is small, and during the process from softening, melting, flow and agitation due to foaming, until curing of the expandable adhesive layer 2 in an adhesive sheet in use, a releasing agent enters the adhesive layer and a releasing function is almost lost.

Specific examples of the releasing agent include organic hot melt polymers such as paraffins and long chain alkyl type compounds; inorganic fine particles such as silicone, calcium carbonate and silicon oxide fine particles. Among them, long chain alkyl type compounds are preferable, from the standpoint of preservation stability and adhesiveness of the adhesive sheet. Organic or inorganic oils are not preferable since they pollute the production line and the use line of the adhesive sheet and significantly decrease adhesiveness of the expandable adhesive layer 2.

As the long chain alkyl type compound, commercially available long chain alkyl type releasing agents can be used. For example, "Piroiru (registered trademark) 1010" (manufactured by Lion Specialty Chemicals Co., Ltd.) as an organic solvent soluble long chain alkyl type releasing agent and "NC003" (manufactured by Chukyo Yushi Co., Ltd.) as a water-dispersible long chain alkyl type releasing agent are mentioned. Particularly, water-dispersible long chain alkyl type compounds are preferable, from the standpoint of prevention of penetration of an organic solvent into the adhesive layer and of ooze of a component of an adhesive from the adhesive layer.

The water-dispersible long chain alkyl type compound may be diluted with water so as to give suitable concentration, and the diluted liquid may be coated so that the thickness of the releasing agent layer 3 after drying is 0.02 to 0.2 μm. When this thickness is 0.02 μm or more, a releasing property tends to be stable, while when 0.2 μm or less, adhesiveness in foaming and curing of the expandable adhesive layer 2 tends to be hard to lower. For coating the water-dispersible long chain alkyl type compound to form a thin film on the surface of a layer having relatively lower polarity such as an epoxy resin adhesive layer, it is preferable to use a suitable wettability improver. Specific examples of the wettability improver include acetylenediol.

[Adhesive Sheet]

The adhesive sheet of the present invention is an adhesive sheet having the expandable adhesive layer 2 explained above, and more specifically, is an adhesive sheet having the expandable adhesive layer 2 on one side or both sides of the base 1 or a base-less type adhesive sheet having no base 1. The adhesive sheet may have layers or members other than the base 1 and the expandable adhesive layer 2, for example, the releasing agent layer 3 and the release film 9.

The adhesive sheet of the present invention has a thickness before foaming and curing of, for example, 10 to 1000 μm. When the adhesive sheet of the present invention is inserted into a narrow interspace such as, for example, a space between a stator core and a coil, the thickness before foaming and curing is preferably 250 μm or less, more preferably 20 to 200 μm.

The adhesive sheet of the present invention is excellent in the initial adhesiveness and excellent also in heat resistance. Specifically, the shear adhesive force according to JIS Z 1541 of the adhesive sheet after foaming and curing of the expandable adhesive layer 2 is preferably 200 N/cm² or more, more preferably 300 N/cm² or more at room temperature (23° C.) and is preferably 50 N/cm² or more, more preferably 100 N/cm² or more after heating at 200° C.

The adhesive sheet of the present invention has durability with which the sheet can endure preservation for a long period of time. Specifically, after carrying out the following durability test A or B on the adhesive sheet after foaming and curing of the expandable adhesive layer 2, the shear adhesive force of the adhesive sheet according to JIS Z 1541 is preferably 50 N/cm² or more, more preferably 100 N/cm² or more at room temperature (23° C.) and after heating at 200° C.

(Durability Test A)

Degradation of the adhesive sheet is promoted under conditions of 200° C. and 500 hours.

(Durability Test B)

The adhesive sheet is immersed in an oil filled in a vessel, further, water is added in an amount of 0.5% with respect to the amount of the oil and the vessel is sealed, and this sealed vessel is heated at 150° C. for 1000 hours to promote degradation.

The adhesive sheet of the present invention is excellent in electric insulation. Specifically, the insulation breakdown voltage according to JIS C 2107 of the adhesive sheet after foaming and curing of the expandable adhesive layer 2 is preferably 3 kV or more, more preferably 5 kV or more and the thermal conductivity thereof is preferably 0.1 W/mK or more, more preferably 0.15 W/mK or more.

The adhesive sheet of the present invention is excellent in bending strength and shape retention capacity after bending. Specifically, the bending moment according to JIS P 8125 of the adhesive sheet before foaming and curing of the expandable adhesive layer 2 is preferably 40 to 600 gf·cm, more preferably 50 to 150 gf·cm. The shape retention rate measured by the following method of the adhesive sheet before foaming and curing of the expandable adhesive layer is preferably 70% or more, more preferably 90% or more.

(Shape Retention Rate)

The adhesive sheet before foaming and curing of the expandable adhesive layer is placed on an aluminum L-shaped mold, a pressing fixture is pressed from above the adhesive sheet toward the corner at an angle of 45°, and bending work is performed to give an L-shape, then, the test piece is taken out, and the angle of the test piece after 5 seconds is measured, and the shape retention rate is calculated according to the following formula.

$$\text{shape retention rate }(\%) = 90° \div (\text{angle five seconds after bending work}) \times 100(\%)$$

The production method of the adhesive sheet of the present invention is not particularly restricted. A double-face adhesive sheet can be produced by forming a first expandable adhesive layer 2 on one surface of the base 1, and forming a second expandable adhesive layer 2 on the other surface of the base 1. A base-less type adhesive sheet can be produced by forming the expandable adhesive layer 2 on the surface of the release film 9, then, laminating another release film 9 on the expandable adhesive layer 2. Other methods than them are also possible, and for example, the adhesive sheet can be fabricated by simultaneously coating the expandable adhesive, or without using the release film 9 on one surface.

The expandable adhesive layer 2 can be formed by conventionally known methods such as, for example, a solution coating method, a melt coating method, a melt extrusion method and a rolling method. The melt coating method is preferable in productivity and economic efficiency since it can be conducted without solvent and does not need a solvent removal step and a treatment equipment. When the melt coating method is used, it is preferable that the epoxy resin contains a crystalline epoxy resin. In this case, by heating at temperatures not lower than the melting temperature of the crystalline epoxy resin, the melt viscosity of the epoxy resin can be lowered and the speed of melt coating can be enhanced.

EXAMPLES

The present invention will be further illustrated by examples below, but the present invention is not limited to them.

<Preparation of Adhesive for Base Fabrication>

The following components were mixed in amounts shown in Table 1 (parts by mass), to obtain adhesives for base fabrication (Compounds 1 to 5).

"EP1": epoxy resin (liquid, viscosity 13,500 mPa·s (25° C.), epoxy equivalent 189 g/eq, BPA type, standard liquid product)

"EP2": epoxy resin (semisolid, epoxy equivalent 173 g/eq, polyfunctional phenol novolac type, heat resistant type)

"EP3": epoxy resin (softening temperature 70° C., epoxy equivalent 210 g/eq, special novolac type, heat resistant type)

"EP4": epoxy resin (softening temperature 92° C., epoxy equivalent 200 g/eq, special polyfunctional type, highly heat resistant type)

"EP5": epoxy resin (softening temperature 86° C., epoxy equivalent 230 g/eq, naphthalene ring type, heat resistant/tough type)

"EP6": epoxy resin (softening temperature 92° C., epoxy equivalent 395 g/eq, isocyanate-modified type, high Tg/high toughness/strong adhesion type)

"PU": linear polyester polyurethane resin (softening temperature 87° C., molecular weight 222300, hydroxyl group content 0.1%, adhesive/flexible type)

"H": thermally expandable microcapsule (average particle diameter 9 μm, expansion initiation temperature 120 to 130° C., maximum expansion temperature 145 to 155° C.)

"T1": phenol resin (softening temperature 87° C., hydroxyl equivalent 178 g/eq, novolac type, highly heat resistant type)

"T2": isocyanate-based curing agent (manufactured by Nippon Polyurethane Industry Co., Ltd., Coronate (registered trademark) L)

"T3": 2-phenyl-4,5-dihydroxymethylimidazole (manufactured by Shikoku Chemicals Corporation, trade name 2PHZ-PW, melting temperature 220° C., active region 141 to 153° C., initiation region 153 to 168° C.)

"J1": magnesium oxide (average particle diameter 3 μm)

"J2": magnesium silicate (average particle diameter 5 μm)

"J3": glass fiber (average fiber diameter 6 μm, average fiber length 50 μm)

"MEK": methyl ethyl ketone

TABLE 1

(Adhesive for Base Fabrication)

|  |  | Compound 1 For Lamination | Compound 2 For Lamination | Compound 3 For Lamination | Compound 4 For Function | Compound 5 For Impregnation |
|---|---|---|---|---|---|---|
| Epoxy Resin | EP1 | 60 |  |  | 60 |  |
|  | EP2 | 30 |  |  | 30 |  |
|  | EP3 | 60 |  |  | 60 |  |
|  | EP4 |  | 50 | 50 |  |  |
|  | EP5 |  | 50 | 50 |  |  |
|  | EP6 |  | 50 | 50 |  |  |
| Polyurethane | PU | 65 | 55 | 35 | 65 | 100 |
| Curing Agent/ | T1 | 150 | 105 |  | 150 |  |
| Curing Catalyst | T2 |  |  |  |  | 20 |
|  | T3 | 0.6 | 0.6 | 7.5 | 0.6 |  |
| Thermally Expandable Microcapsule | H |  | 8 | 5 |  |  |
| Heat Resistant Filler | J1 | 70 | 45 | 20 | 70 | 20 |
|  | J2 | 295 |  |  | 245 | 130 |
|  | J3 |  |  |  | 50 |  |
| Solvent | MEK | 500 | 300 | 150 | 500 | 800 |

<Fabrication of Base>

The following members F1 to F6 and P were prepared as members for base.

"F1": polyethylene naphthalate (PEN) film (manufactured by Dupont Teijin Films, Teonex (registered trademark) Q51, thickness 38 μm)

"F2": polyethylene naphthalate (PEN) film (manufactured by Dupont Teijin Films, Teonex (registered trademark) Q51, thickness 12 μm)

"F3": polyphenylene sulfide (PPS) film (manufactured by Toray Industries, Inc., TORAYLINA (registered trademark) #50-2030, thickness 50 μm)

"F4": polyethylene terephthalate (PET) film (manufactured by Toray Industries, Inc., Lumirror (registered trademark) S-10, thickness 50 μm)

"F5": polyethylene terephthalate (PET) film (manufactured by Toray Industries, Inc., Lumirror (registered trademark) S-10, thickness 38 μm)

"F6": mixed non-woven fabric of aramid and polyester, impregnated with adhesive (Compound 5) (This non-woven fabric F6 was obtained by impregnating a mixed non-woven fabric of an aramid and a polyester (manufactured by Teijin Limited., Conex (registered trademark), thickness 40 μm (20 g/m²)) with an adhesive (Compound 5) as a urethan resin composition so that the coating mass after drying was about 40 g/m², then, drying this.)

"P": aromatic polyamide paper (manufactured by Dupont, Nomex (registered trademark), thickness 60 μm)

The following bases K1a to K10 were fabricated using the above-described members F1 to F6 and P, and adhesives for base fabrication (Compounds 1 to 5).

"K1a": Laminated base in which two PEN films F1 are laminated with adhesive (Compound 1). (This laminated base K1a was obtained by coating an adhesive (Compound 1) on one surface of the PEN film F1 so that the thickness after drying was 30 μm, thereafter, drying this, and laminating another PEN film F1 to the film by pressing with hot rolls heated at 100° C.)

"K1b": Laminated base in which two PEN films F1 are laminated with adhesive (Compound 2). (This laminated base K1b was obtained in the same manner as for the laminated base K1a, excepting that an adhesive (Compound 2) was used.)

"K2": Laminated base in which PEN film F1 and PET film F5 are laminated with adhesive (Compound 1). (This laminated base K2 was obtained in the same manner as for the laminated base K1a, excepting that PEN film F1 and PET film F5 were used.)

"K3": Laminated base in which two PET films F5 are laminated with adhesive (Compound 1). (This laminated base K3 was obtained in the same manner as for the laminated base K1a, excepting that two PET films F5 were used.)

"K4": Laminated base in which PEN film F1 and aromatic polyamide paper P are laminated with adhesive (Compound 1). (This laminated base K4 was obtained in the same manner as for the laminated base K1a, excepting that PEN film F1 and aromatic polyamide paper P were used.)

"K5a": Laminated base in which PEN film F1 and non-woven fabric F6 impregnated with adhesive (Compound 5) are laminated with adhesive (Compound 2). (This laminated base K5a was obtained by coating an adhesive (Compound 2) on one surface of PEN film F1 so that the thickness after drying was 25 μm, thereafter, drying this, and laminating a non-woven fabric F6 impregnated with an adhesive (Compound 5) to the film by pressing with hot rolls heated at 100° C.)

"K5b": Laminated base in which PEN film F1 and non-woven fabric F6 impregnated with adhesive (Compound 5) are laminated with adhesive (Compound 3). (This laminated base K5b was obtained in the same manner as for the laminated base K5a, excepting that an adhesive (Compound 3) was used.)

"K6": Base having layer composed of adhesive (Compound 4) on both sides of one PEN film F1. (This base K6 was obtained by coating an adhesive (Compound 4) on each of both sides of PEN film F1 so that the thickness after drying was 15 μm, then, drying this.)

"K7": Laminated base in which two PEN films F2 are laminated with adhesive (Compound 4). (This base K7 was obtained by coating an adhesive (Compound 4) on one side of PEN film F2 so that the thickness after drying was 30 μm, thereafter, drying this, and laminating another PEN film to the film by pressing with hot rolls heated at 100° C.)

"K8": Base using one PEN film F1 as it is.

"K9": Base using one PPS film F3 as it is.

"K10": Base using one PET film F4 as it is.

<Preparation of Adhesive for Expandable Adhesive Layer>

The following components were mixed in amounts shown in Table 2 (parts by mass), to obtain expandable adhesives (Compounds 2 to 3 and 6 to 8). The adhesives having Compounds 2 to 3 have the same compositions as Compounds 2 to 3 prepared previously as an adhesive for base fabrication.

"EP1": epoxy resin (liquid, viscosity 13,500 mPa·s (25° C.), epoxy equivalent 189 g/eq, BPA type, standard liquid product)

"EP2": epoxy resin (semisolid, epoxy equivalent 173 g/eq, polyfunctional phenol novolac type, heat resistant type)

"EP3": epoxy resin (softening temperature 70° C., epoxy equivalent 210 g/eq, special novolac type, heat resistant type)

"EP4": epoxy resin (softening temperature 92° C., epoxy equivalent 200 g/eq, special polyfunctional type, highly heat resistant type)

"EP5": epoxy resin (softening temperature 86° C., epoxy equivalent 230 g/eq, naphthalene ring type, heat resistant/tough type)

"EP6": epoxy resin (softening temperature 92° C., epoxy equivalent 395 g/eq, isocyanate-modified type, high Tg/high toughness/strong adhesion type)

"EP7": epoxy resin (softening temperature 92° C., epoxy equivalent 218 g/eq, o-cresol novolac type, adhesiveness type)

"EP8": epoxy resin (softening temperature 70° C., epoxy equivalent 288 g/eq, novolac type, high toughness type)

"PU": linear polyester polyurethane resin (softening temperature 87° C., molecular weight 222300, hydroxyl group content 0.1%, adhesive/flexible type)

"H": thermally expandable microcapsule (average particle diameter 9 μm, expansion initiation temperature 120 to 130° C., maximum expansion temperature 145 to 155° C.)

"T1": phenol resin (softening temperature 87° C., hydroxyl equivalent 178 g/eq, novolac type, highly heat resistant type)

"T2": isocyanate-based curing agent (manufactured by Nippon Polyurethane Industry Co., Ltd., Coronate (registered trademark) L)

"T3": 2-phenyl-4,5-dihydroxymethylimidazole (manufactured by Shikoku Chemicals Corporation, trade name 2PHZ-PW, melting temperature 220° C., active region 141 to 153° C., initiation region 153 to 168° C.)

"J1": magnesium oxide (average particle diameter 3 μm)

"J2": magnesium silicate (average particle diameter 5 μm)

"J3": glass fiber (average fiber diameter 6 μm, average fiber length 50 μm)

"MEK": methyl ethyl ketone

TABLE 2

(Adhesive for Expandable Adhesive Layer)

|  |  | Compound 2 | Compound 3 | Compound 6 | Compound 7 | Compound 8 |
|---|---|---|---|---|---|---|
| Epoxy Resin | EP1 |  |  |  |  | 15 |
|  | EP2 |  |  |  |  | 65 |
|  | EP3 |  |  | 60 |  |  |
|  | EP4 | 50 | 50 |  | 50 |  |
|  | EP5 | 50 | 50 | 20 | 50 | 10 |
|  | EP6 | 50 | 50 |  | 30 |  |
|  | EP7 |  |  | 70 | 20 |  |
|  | EP8 |  |  | 35 |  |  |
| Polyurethane | PU | 55 | 35 | 80 | 55 | 45 |
| Curing Agent/ | T1 | 105 |  | 150 | 110 | 100 |
| Curing Catalyst | T3 | 0.6 | 7.5 | 7.4 | 0.6 | 0.4 |
| Thermally Expandable Microcapsule | H | 8 | 5 | 12 | 12 | 10 |
| Heat Resistant Filler | J1 | 45 | 20 | 50 | 30 | 25 |
|  | J2 |  |  | 50 | 30 | 25 |
|  | J3 |  |  |  | 25 |  |
| Solvent | MEK | 300 | 150 | 400 | 400 | 250 |

<Preparation of Releasing Agent X>

Ten (10) parts by mass of a water-dispersible long chain alkyl type compound (manufactured by Chukyo Yushi Co., Ltd., trade name NC003), 0.4 parts by mass of acetylenediol (manufactured by Air Products and Chemicals, Inc.) and 389.6 parts by mass of distilled water were mixed, to obtain a releasing agent X.

Examples 1 to 10, Reference Examples 1 to 3 and Comparative Examples 1 to 2

Expandable adhesives (Compounds 2 to 3 and 6 to 7) were coated on one side of bases K1a to K10 so that the thickness after drying was about 35 μm (about 25 μm in Example 8, about 30 μm in Examples 9 and 10), thereafter, the solvent was removed by drying at 90° C. for 5 minutes, to form expandable adhesive layers. Onto the surface of this expandable adhesive layer, a 38 μm thick polyester film having undergone a silicone releasing treatment on one side was pressed with hot rolls heated at 100° C., to obtain a first step product. On another surface of this first step product, the same kind of expandable adhesive composition was coated so that the thickness after drying was about 35 μm (about 25 μm in Example 8, about 30 μm in Examples 9 and 10), thereafter, the solvent was removed by drying at 90° C. for 5 minutes, to form an expandable adhesive layer. Onto the surface of this expandable adhesive layer, a 38 μm thick polyester film having undergone a silicone releasing treatment on one side was pressed with hot rolls heated at 100° C., to obtain a second step product. Next, one polyester film was peeled, and about 10 g/m² of a releasing agent X was coated on its peeled surface, thereafter, dried at 90° C. for 3 minutes, to form a releasing agent layer on the expandable adhesive layer. Subsequently, the other polyester film was wound while peeling, to obtain adhesive sheets of Examples 1 to 10, Reference Examples 1 to 3 and Comparative Examples 1 to 2.

Example 11

On a 38 μm thick polyester film having undergone a silicone heavy peeling/releasing treatment on one side, an expandable adhesive (Compound 8) was coated so that the thickness after drying was 25 μm, thereafter, the solvent was removed by drying at 90° C. for 5 minutes, to form an expandable adhesive layer. On the surface of this expandable adhesive layer, a 38 μm thick polyester film having undergone a silicone light peeling/releasing treatment on one surface was laminated and the laminate was wound, to obtain an adhesive sheet of Example 11. In use of this adhesive sheet, the polyester films having undergone a releasing treatment on both sides were peeled, and a baseless type adhesive sheet composed only of the expandable adhesive layer is used.

The adhesive sheets of Examples 1 to 11, Reference Examples 1 to 3 and Comparative Examples 1 to 2 described above were evaluated according to the following methods. The results are shown in Tables 3 to 5.

[Thickness of Adhesive Sheet]

The thickness of an adhesive sheet before foaming was measured by a test method using a thickness gauge according to "Testing methods of pressure-sensitive adhesive tapes and sheets" of JIS Z 0237. For an adhesive sheet after foaming, an adhesive sheet before foaming was cut into a size of 50×50 mm, the cut sheet was hung in a longitudinal direction in a hot air dryer, and foamed and cured under conditions of 170° C. and 10 minutes, cooled at room temperature for 2 hours, thereafter, the thickness thereof was measured by the same method as described above.

[Tensile Strength]

The tensile strength (N/10 mm) of an adhesive sheet after foaming was measured according to "Methods of test for pressure-sensitive adhesive tapes for electrical purposes" of JIS C 2107. The method of foaming of an adhesive sheet is the same as the method described in the item of the thickness of an adhesive sheet described above (the same shall apply hereinafter).

[Elongation]

The elongation (%) of an adhesive sheet after foaming was measured according to "Methods of test for pressure-sensitive adhesive tapes for electrical purposes" of JIS C 2107.

[Insulation Breakdown Voltage]

The insulation breakdown voltage (kV) of an adhesive sheet after foaming was measured according to "Methods of test for pressure-sensitive adhesive tapes for electrical purposes" of JIS C 2107.

[Shear Adhesive Force (Room Temperature (23° C.), or after Heating at 200° C.)]

Figure 8:
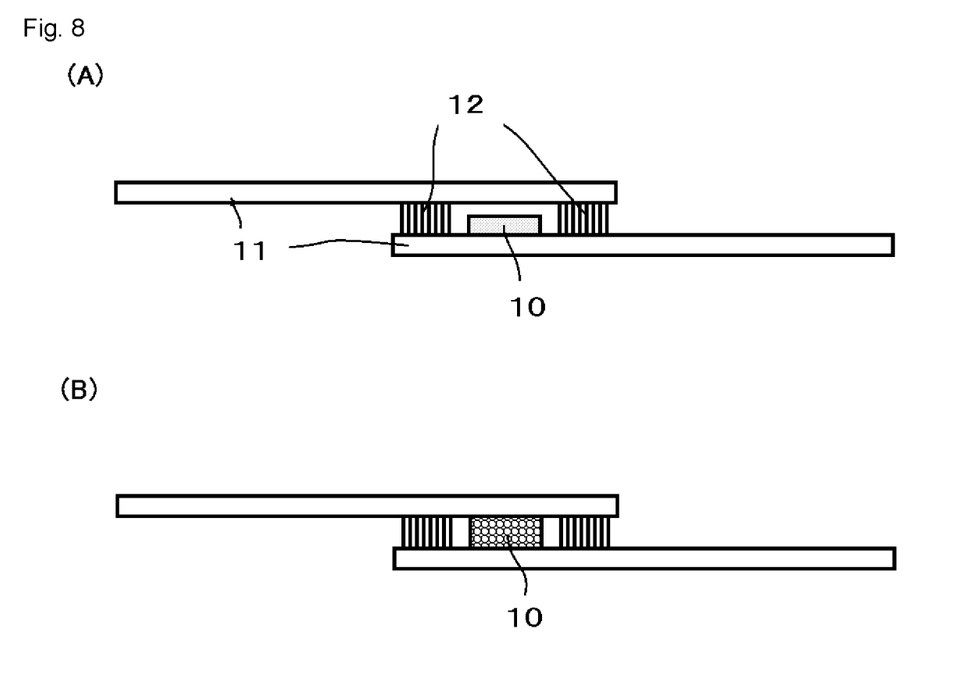
FIG. 8 is a schematic view for illustrating the test method of shearing adhesive force in an example.

The shear adhesive force of an adhesive sheet after foaming as shown below was measured according to a tensile shear adhesive force test method described in JIS Z 1541 "High potential pressure sensitive adhesive double coated tapes". As an adherend, an SPCC plate (manufactured by Nisshin Steel Co., Ltd., trade name SPCC-SB NCB, 1.0 mm thick, 12×100 mm) was used. The sample lamination area was 10×10 mm, the foaming and curing conditions included 170° C. and 10 minutes, and the tensile speed was 200 mm/min. First, as shown in FIG. 8(A), an adhesive sheet 10 before foaming was placed on an SPCC plate 11, further, another SPCC plate 11 was placed via two metal interspace gauges 12, then, as shown in FIG. 8(B), the adhesive sheet 10 was foamed and cured, and this adhesive sheet 10 after foaming was subjected to tensile shear adhesive force measurement (room temperature (23° C.), or after heating at 200° C.).

[Thermal Conductivity]

The thermal conductivity of an adhesive sheet after foaming was measured using a quick thermal conductivity meter manufactured by Kyoto Electronics Manufacturing Co., Ltd. at thin film measurement mode. Specifically, three kinds of reference blocks having known thermal conductivity were placed on an aluminum plate (10 mm thick, 250×350 mm), and a test piece for measurement (45×100 mm) was placed thereon, and further, a sensor probe (trade name PD-11, 40×97 mm, 820 g) for measuring thermal conductivity equipped with heater wire and a thermocouple was placed thereon, and measurement was started. As the reference block, foamed polyethylene (thermal conductivity 0.0347 W/mK), silicone rubber (thermal conductivity 0.236 W/mK) and quartz glass (thermal conductivity 1.416) were used.

[Durability Test]

Degradation of an adhesive sheet 10 (FIG. 8(B)) after foaming which was the same as the test piece of the shear adhesive force test described above was promoted under conditions of 200° C. and 500 hours, and the shear adhesive force (room temperature (23° C.), and after heating at 200° C.) of the adhesive sheet 10 after degradation promotion was measured by the same method as the shear adhesive force test described above.

Separately, an adhesive sheet 10 (FIG. 8(B)) after foaming which was the same as the test piece of the shear adhesive force test described above was immersed in a stainless vessel containing a suitable amount of Toyota genuine ATF oil (WS), and further, water in an amount of 0.5% with respect to the amount of the ATF oil was added and the vessel was sealed, and this sealed vessel was heated at 150° C. for 1000 hours to promote degradation, and the shear adhesive force (room temperature (23° C.), and after heating at 200° C.) of the adhesive sheet 10 after degradation promotion was measured by the same method as the shear adhesive force test described above. Simultaneously, the insulation breakdown voltage, the tensile strength and the elongation were measured.

[Stiffness]

As the stiffness of an adhesive sheet before foaming, the resisting force in bending the formed adhesive sheet was measured. Specifically, the test was conducted according to "Paper and board.—Determination of stiffness—(Taber stiffness tester method)" of JIS P 8125, and the bending moment was calculated according to the following formula.

bending moment (gf·cm)=(scale read)×38.0 (mm)÷ (width of test piece measured: mm)

[Resin Close Adhesion]

In the following shape retention capacity test, the test piece after evaluation of bending work was observed and whether the foamed adhesive layer was partially detached from the heat resistance base was observed visually.

[Shape Retention Capacity]

Figure 9:
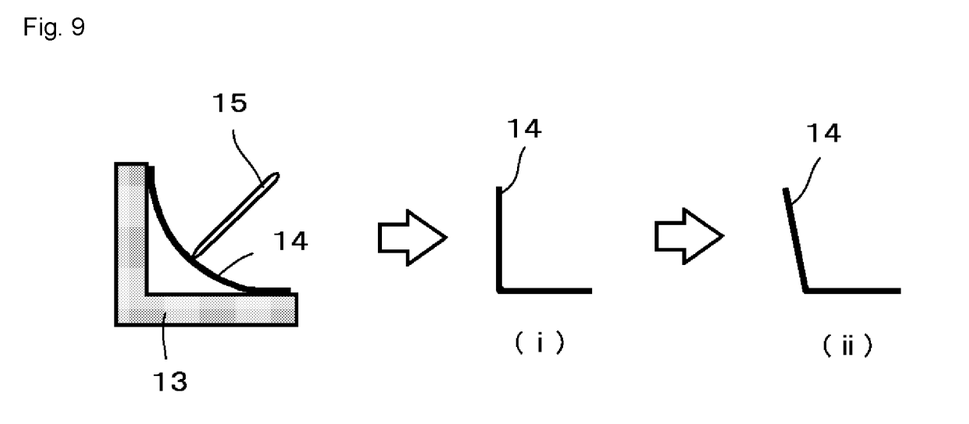
FIG. 9 is a schematic view for illustrating the test method of shape retention capacity in an example.

As shown in FIG. 9, a test piece (adhesive sheet 14) before foaming was placed on an aluminum L-shaped mold 13 (thickness 3 mm), a pressing fixture 15 having a shape like a pizza cutter was pressed from above the test piece 14 at an angle of 45° toward the corner, and bending work was performed while rotating the pressing fixture so as to change the test piece 14 to an L-shape as shown in FIG. 9(i). The test piece was taken out after the bending work, and the shape of the test piece 14 after 5 seconds as shown in FIG. 9(ii) was measured by a protractor. The calculation was carried out by the following formula, and shape retention capacity was evaluated according to the following criteria.

shape retention rate (%)=90°÷(angle five seconds after bending work)×100(%)

"A": shape retention rate is 80% or more and 100% or less
"B": shape retention rate is 65% or more and less than 80%
"X": shape retention rate is less than 65%

[Uniformity of Thickness after Foaming]

For the test piece for measurement of the thickness of the adhesive sheet after foaming described above, the thickness was measured at 10 points, and the maximum thickness and the minimum thickness with respect to the average thickness were evaluated according to the following judgment criterion.

"A": The difference of the maximum or minimum thickness from the average thickness is within 5% of the average thickness.

[Agglutination]

A sample before foaming and curing was cut into two pieces having a size of 25×80 mm, a powder of calcium carbonate was rubbed thinly on the surface of an expandable adhesive layer from one side of the length direction to a position of 15 mm from the side, to form a non-tacky part (adhesive area is 25×65 mm). Thereafter, the two pieces were laminated each other with facing the releasing agent layers to obtain a test piece. The test piece was sandwiched between two stainless plates, a load of 1 kg was applied. Then, the test piece was left at 40° C. for 336 hours, and taken out, and allowed to cool at room temperature for 2 hours. Then, the test piece was peeled and divided, and the extent of agglutination was evaluated according to the following criterion.

"A": Both adhesion surfaces are glossy, and agglutination is not observed at all.

TABLE 3

| | | | Ex. 1 | Ex. 2 | Ex. 3 | Ex. 4 | Ex. 5 | Ex. 6 |
|---|---|---|---|---|---|---|---|---|
| | Base | | K1a | K1b | K1a | K2 | K3 | K4 |
| | Layer Constitution and Adhesive | | F1-F1 | F1-F1 | F1-F1 | F1-F5 | F5-F5 | F1-P |
| | | | Compound 1 | Compound 2 | Compound 1 | Compound 1 | Compound 1 | Compound 1 |
| | Expandable Adhesive Layer | | Compound 2 | Compound 2 | Compound 6 | Compound 6 | Compound 6 | Compound 2 |
| | Thickness (µm) | Before Foaming | 204 | 190 | 208 | 194 | 198 | 199 |
| | | After Foaming | 351 | 368 | 363 | 331 | 345 | 336 |
| | Tensile Strength [After Foaming] (N/10 mm) | | 159 | 162 | 155 | 143 | 132 | 126 |
| | Elongation [After Foaming] (%) | | 25 | 28 | 23 | 32 | 18 | 13 |
| | Insulation Breakdown Voltage [After Foaming] (kV) | | 17.8 | 16.5 | 17.3 | 16.8 | 17.4 | 12.2 |
| Shear Adhesive Force (N/cm$^2$) | Metal Interspace Gauge (µm) | | 275 | 275 | 275 | 275 | 275 | 275 |
| | Room Temperature | | 721 | 710 | 697 | 671 | 625 | 680 |
| | Heating at 200° C. | | 146 | 124 | 133 | 139 | 148 | 127 |
| | Thermal Conductivity [After Foaming] (W/mk) | | 0.188 | 0.125 | 0.210 | 0.202 | 0.195 | 0.180 |
| Durability Test | 200° C. × 500 hr | Shear Adhesive Force (N/cm$^2$) Room Temp | 477 | 394 | 697 | 409 | 463 | 433 |
| | | Heating at 200° C. | 196 | 205 | 220 | 177 | 146 | 163 |
| | After ATF Test 150° C., 0.5% Water Content, 1000 hrs | Shear Adhesive Force (N/cm$^2$) Room Temp | 894 | 816 | 792 | 771 | 712 | 824 |
| | | Heating at 200° C. | 189 | 131 | 146 | 153 | 168 | 143 |
| | | Insulation Breakdown Voltage (kV) | 17.6 | 16.3 | 16.8 | 17.5 | 17.2 | 12.5 |
| | | Tensile Strength Retention rate (%) | 88 | 79 | 84 | 72 | 63 | 81 |
| | | Elongation (%) | 4 | 4 | 4 | 3 | 2 | 3 |
| | Strength [Before Foaming] (gf·cm) | | 151 | 179 | 145 | 131 | 124 | 149 |
| | Resin Close Adhesion [Resin was Peeled Off (X), or was not (A)] | | A | A | A | A | A | A |
| | Shape Retention Capacity | | A | A | A | A | A | A |
| | Uniformity of Thickness After Foaming | | A | A | A | A | A | A |
| | Agglutination | | A | A | A | A | A | A |

TABLE 4

| | Ex. 7 | Ex. 8 | Ex. 9 | Ex. 10 | Ex. 11 |
|---|---|---|---|---|---|
| Base | K5a | K6 | K7 | K8 | — |
| Layer Constitution and Adhesive | F1-F6 Compound 2 | -F1- Compound 4 (Both-side) | F2-F2 Compound 1 | F1 | (Baseless) |

TABLE 4-continued

|  |  | Ex. 7 | Ex. 8 | Ex. 9 | Ex. 10 | Ex. 11 |
|---|---|---|---|---|---|---|
| Expandable Adhesive Layer | | Compound 2 | Compound 2 | Compound 7 | Compound 7 | Compound 8 |
| Thickness (μm) | Before Foaming | 198 | 120 | 100 | 99 | 27 |
|  | After Foaming | 333 | 250 | 257 | 248 | 68 |
| Tensile Strength [After Foaming] (N/10 mm) | | 123 | 86 | 91 | 88 | — |
| Elongation [After Foaming] (%) | | 15 | 20 | 20 | 19 | — |
| Insulation Breakdown Voltage [After Foaming] (kV) | | 11.1 | 12.5 | 11.6 | 12.1 | — |
| Shear Adhesive Force (N/cm$^2$) | Metal Interspace Gauge (μm) | 275 | 200 | 200 | 200 | 50 |
|  | Room Temperature | 591 | 550 | 423 | 456 | 733 |
|  | Heating at 200° C. | 134 | 115 | 146 | 159 | 254 |
| Thermal Conductivity [After Foaming] (W/mk) | | 0.167 | 0.139 | 0.134 | 0.145 | 0.511 |
| Durability Test 200° C. × 500 hr | Shear Adhesive Force (N/cm$^2$) Room Temp | 306 | 351 | 245 | 290 | 813 |
|  | Heating at 200° C. | 144 | 135 | 186 | 203 | 382 |
| After ATF Test 150° C., 0.5% Water Content, 1000 hrs | Shear Adhesive Force (N/cm$^2$) Room Temp | 798 | 621 | 566 | 553 | — |
|  | Heating at 200° C. | 139 | 154 | 201 | 179 | — |
|  | Insulation Breakdown Voltage (kV) | 11.9 | 12.8 | 11.6 | 12.4 | — |
|  | Tensile Strength Retention rate (%) | 68 | 78 | 82 | 83 | — |
|  | Elongation (%) | 3 | 4 | 5 | 5 | — |
| Strength [Before Foaming] (gf-cm) | | 155 | 77 | 67 | 70 | — |
| Resin Close Adhesion [Resin was Peeled Off (X), or was not (A)] | | A | A | A | A | — |
| Shape Retention Capacity | | A | A | A | A | — |
| Uniformity of Thickness After Foaming | | A | A | A | A | — |
| Agglutination | | A | A | A | A | — |

TABLE 5

|  |  | Ref. Ex. 1 | Ref. Ex. 2 | Ref. Ex. 3 | Comp. Ex. 1 | Comp. Ex. 2 |
|---|---|---|---|---|---|---|
| Base | | K9 | K10 | K8 | K10 | K5b |
| Layer Constitution and Adhesive | | F3 | F4 | F1 | F4 | F1-F6 Compound 3 |
| Expandable Adhesive Layer | | Compound 2 | Compound 2 | Compound 6 | Compound 3 | Compound 3 |
| Thickness (μm) | Before Foaming | 182 | 161 | 99 | 172 | 168 |
|  | After Foaming | 386 | 338 | 191 | 350 | 331 |
| Tensile Strength [After Foaming] (N/10 mm) | | 118 | 91 | 88 | 98 | 116 |
| Elongation [After Foaming] (%) | | 30 | 7 | 5 | 8 | 6 |
| Insulation Breakdown Voltage [After Foaming] (kV) | | 12.3 | 14.0 | 11.7 | 14.6 | 12.1 |
| Shear Adhesive Force (N/cm$^2$) | Metal Interspace Gauge (μm) | 275 | 275 | 150 | 275 | 275 |
|  | Room Temperature | 698 | 649 | 427 | 171 | 183 |
|  | Heating at 200° C. | 128 | 135 | 116 | 126 | 115 |
| Thermal Conductivity [After Foaming] (W/mk) | | 0.113 | 0.135 | 0.153 | 0.128 | 0.139 |
| Durability Test 200° C. × 500 hr | Shear Adhesive Force (N/cm$^2$) Room Temp | 323 | 318 | 320 | 3 | 21 |
|  | Heating at 200° C. | 204 | 150 | 114 | 0 | 59 |
| After ATF Test 150° C., 0.5% Water Content, 1000 hrs | Shear Adhesive Force (N/cm$^2$) Room Temp | 634 | 570 | — | They were not evaluated due to poor durability at 200° C. | |
|  | Heating at 200° C. | 177 | 168 | — | | |
|  | Insulation Breakdown Voltage (kV) | 11.5 | 13.4 | — | | |
|  | Tensile Strength Retention rate (%) | 81 | 43 | — | | |
|  | Elongation (%) | 6 | 2 | — | | |
| Strength [Before Foaming] (gf-cm) | | 20 | 19 | 11 | 22 | 115 |
| Resin Close Adhesion [Resin was Peeled Off (X), or was not (A)] | | A | A | A | A | A |
| Shape Retention Capacity | | X | X | X | X | A |
| Uniformity of Thickness After Foaming | | A | A | A | A | A |
| Agglutination | | A | A | A | A | A |

<Evaluation>

As apparent from the results shown in Table 3, the adhesive sheets of Examples 1 to 10 were excellent in all properties. Specifically, in the initial stages, adhesion strength and electric insulation were excellent, and even after the severe durability test at 200° C. for 500 hours, high adhesion strength was maintained, and heat resistance was excellent. Further, even after the severe oil resistance test (ATF test) at 150° C. for 1000 hours, high insulation breakdown voltage, adhesive strength and sheet tensile strength were kept, and oil resistance was excellent. Further, suitable sheet strength and shape retention capacity after bending were held, and workability was excellent. Furthermore, by coating a releasing agent on the surface of an adhesive layer, a constitution in which a release paper is not necessarily used was made possible. Also the adhesive sheet of Example 11 was excellent in adhesion strength in the initial stages, and even after the severe durability test at 200° C. for 500 hours, maintained high adhesion strength, and was excellent in heat resistance.

In contrast, the adhesive sheets of Comparative Examples 1 and 2 were inferior in shear adhesive force (particularly, shear adhesive force after durability test (200° C.×500 hr)) since the adhesive (Compound 3) containing no phenol resin T1 was used as the adhesive for forming an expandable adhesive layer. This is supposed to be cause by insufficiency of durability such as long term heat resistance of the adhesive (Compound 3).

The adhesive sheets of Reference Examples 1 to 3 and Comparative Example 1 were inferior in stiffness and shape retention capacity. This is supposed to be cause by use of the bases K8 to K10 as a thin single-layered film (Though the base K8 as a thin single-layered film was used also in Example 10, stiffness and shape retention capacity were not problematic in Example 10 since the adhesive (Compound 7) containing grass fiber was used in the expandable adhesive layer in Example 10.). However, the adhesive sheets of Reference Examples 1 to 3 were more excellent in shear adhesive force (particularly, shear adhesive force after durability test (200° C.×500 hr)) than Comparative Examples 1 and 2 since the adhesive (Compound 2 or 6) containing the phenol resin T1 was used as the adhesive for forming an expandable adhesive layer. Namely, it is concluded that the effect of the present invention is manifested also in Reference Examples 1 to 3.

INDUSTRIAL APPLICABILITY

The adhesive sheet of the present invention is excellent in flexibility, electric insulation, heat resistance and adhesiveness irrespective of foaming and curing for short period of time. That is, the inventive adhesive sheet is useful, for example, in an application for filling an interspace between adherend members by foaming and curing an expandable adhesive layer for the purpose of adhesion and insulation between the adherend members. Specifically, the inventive adhesive sheet can be used between two members such as a stator and a coil in a motor generator, foamed and expanded by heating, and filled in its interspace to mutually adhere the members.

EXPLANATION OF NUMERALS

1: base
2: expandable adhesive layer
3: releasing agent layer
4: film
5: adhesive layer for lamination
6: non-woven fabric
7: paper
8: functional adhesive layer
9: release film
10: adhesive sheet
11: SPCC plate
12: metal interspace gauge
13: aluminum L-shaped mold
14: adhesive sheet
15: pressing fixture

The invention claimed is:

1. An adhesive sheet having an expandable adhesive layer containing an epoxy resin comprising a polyfunctional epoxy resin, a phenol resin as a curing agent, an imidazole-based compound as a curing catalyst and a temperature-sensitive foaming agent, wherein a releasing agent is coated on the surface of at least one expandable adhesive layer.

2. The adhesive sheet according to claim 1, wherein the temperature-sensitive foaming agent comprising a thermally expandable microcapsule, and the foaming temperature of the thermally expandable microcapsule is not less than the softening temperature of the epoxy resin and not more than the activation temperature of the curing reaction of the epoxy resin.

3. The adhesive sheet according to claim 1, wherein the ratio of the hydroxyl group equivalent number of the phenol resin as a curing agent to the epoxy equivalent number of the epoxy resin in the expandable adhesive layer is 0.5 to 2.0.

4. The adhesive sheet according to claim 1, wherein the content of the imidazole-based compound is 0.1 to 1.0 part by mass with respect to 100 parts by mass of resin components in the expandable adhesive layer.

5. The adhesive sheet according to claim 1, wherein the content of the temperature-sensitive foaming agent is 0.5 to 20 parts by mass with respect to 100 parts by mass of resin components in the expandable adhesive layer.

6. The adhesive sheet according to claim 1, wherein the expandable adhesive layer further contains a urethane resin.

7. The adhesive sheet according to claim 6, wherein the expandable adhesive layer is provided on both sides of the base, and the base is composed of a laminate having a laminated structure in which a resin film and a non-woven fabric, or a resin film and a paper, or a resin film and a resin film are laminated with an adhesive for lamination.

8. The adhesive sheet according to claim 7, wherein the expandable adhesive layer or the functional adhesive layer contains a heat resistant filler.

9. The adhesive sheet according to claim 1, having the expandable adhesive layer on one side or both sides of the base.

10. The adhesive sheet according to claim 9, the base is composed of a laminate having a laminated structure in which a resin film and a non-woven fabric, or a resin film and a paper, or a resin film and a resin film are laminated with an adhesive for lamination.

11. The adhesive sheet according to claim 10, wherein the expandable adhesive layer or the adhesive for lamination contains a heat resistant filler.

12. The adhesive sheet according to claim 10, wherein the expandable adhesive layer or the adhesive for lamination contains a fibrous filler.

13. The adhesive sheet according to claim 9, wherein the base is composed of a laminate having a functional adhesive layer on one side or both sides of a member selected from the group consisting of a resin film, a non-woven fabric and a paper.

14. The adhesive sheet according to claim 13, wherein the expandable adhesive layer or the functional adhesive layer contains a heat resistant filler.

15. The adhesive sheet according to claim 13, wherein the expandable adhesive layer or the functional adhesive layer contains a fibrous filler.

16. The adhesive sheet according to claim 15, wherein the fibrous filler is a glass fiber, the average fiber diameter of the glass fiber is 1 to 20 μm, and the average fiber length thereof is 10 to 200 μm.

17. The adhesive sheet according to claim 12, wherein the fibrous filler is a glass fiber, the average fiber diameter of the glass fiber is 1 to 20 μm, and the average fiber length thereof is 10 to 200 μm.

18. The adhesive sheet according to claim 10, wherein the non-woven fabric is at least one non-woven fabric selected from the group consisting of an aramide fiber non-woven fabric, a glass fiber non-woven fabric, a polyphenylene sulfide fiber non-woven fabric, a heat resistance nylon fiber non-woven fabric and a heat resistant polyester fiber non-woven fabric.

19. The adhesive sheet according to claim 10, wherein the paper is a highly heat resistant paper composed of a wholly aromatic polyamide polymer.

20. The adhesive sheet according to claim 1, wherein the expandable adhesive layer is disposed on both sides of the base, and a releasing agent is coated on the surface of at least one expandable adhesive layer.

21. The adhesive sheet according to claim 1, wherein the releasing agent is a long chain alkyl compound.

22. The adhesive sheet according to claim 1, wherein the shear adhesive force according to JIS Z 1541 of the adhesive sheet after foaming and curing of the expandable adhesive layer is 200 N/cm$^2$ or more at room temperature (23° C.), and is 50 N/cm$^2$ or more after heating at 200° C.

23. The adhesive sheet according to claim 1, wherein after carrying out the following durability test A or B on the adhesive sheet after foaming and curing of the expandable adhesive layer, the shear adhesive force of the adhesive sheet according to JIS Z 1541 is 50 N/cm$^2$ or more at room temperature (23° C.) and after heating at 200° C.:

(Durability test A)
Degradation of the adhesive sheet is promoted under conditions of 200° C. and 500 hours;

(Durability test B)
The adhesive sheet is immersed in an oil filled in a vessel, further, water is added in an amount of 0.5% with respect to the amount of the oil and the vessel is sealed, and this sealed vessel is heated at 150° C. for 1000 hours to promote degradation.

24. The adhesive sheet according to claim 1, wherein the insulation breakdown voltage according to JIS C 2107 of the adhesive sheet after foaming and curing of the expandable adhesive layer is 10 kV or more and the thermal conductivity thereof is 0.1 W/mK or more.

25. The adhesive sheet according to claim 1, wherein the bending moment according to JIS P 8125 of the adhesive sheet before foaming and curing of the expandable adhesive layer is 40 to 600 gf·cm.

26. The adhesive sheet according to claim 1, wherein the shape retention rate measured by the following method of the adhesive sheet before foaming and curing of the expandable adhesive layer is 70% or more:

(Shape retention rate)
The adhesive sheet before foaming and curing of the expandable adhesive layer is placed on an aluminum L-shaped mold, a pressing fixture is pressed from above the adhesive sheet toward the corner at an angle of 45°, and bending work is performed to give an L-shape, then, the test piece is taken out, and the angle of the bended part of the test piece after 5 seconds is measured, and the shape retention rate is calculated according to the following formula:

shape retention rate (%)=90°÷(angle five seconds after bending work)×100(%).

27. The adhesive sheet according to claim 1, wherein the thickness of the adhesive sheet before foaming and curing of the expandable adhesive layer is 250 μm or less.

28. The adhesive sheet according to claim 1, used in an application of filling an interspace between adherend members with the expandable adhesive layer foamed and cured, for adhesion and insulation between the adherend members.

29. The adhesive sheet according to claim 28, used for adhesion and insulation of a slot of a motor.

30. The adhesive sheet according to claim 1, wherein the releasing agent coated on the surface of the at least one expandable adhesive layer is an outermost layer and constitutes an adhesion surface of the adhesive sheet.

31. The adhesive sheet according to claim 1, wherein the releasing agent constitutes a part of the adhesive sheet in use.

* * * * *